(12) United States Patent
Pettersson et al.

(10) Patent No.: US 9,844,792 B2
(45) Date of Patent: Dec. 19, 2017

(54) SURFACE SPATTERING DEVICE

(75) Inventors: Bo Pettersson, London (GB); Klaus Schneider, Dornbirn (AT); Benedikt Zebhauser, Rorschach (CH); Knut Siercks, Moerschwil (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 396 days.

(21) Appl. No.: 13/823,539

(22) PCT Filed: Sep. 20, 2011

(86) PCT No.: PCT/EP2011/066356
§ 371 (c)(1),
(2), (4) Date: Mar. 14, 2013

(87) PCT Pub. No.: WO2012/038446
PCT Pub. Date: Mar. 29, 2012

(65) Prior Publication Data
US 2014/0076985 A1    Mar. 20, 2014

(30) Foreign Application Priority Data

Sep. 22, 2010 (EP) .................................... 10178353

(51) Int. Cl.
*B05B 12/12* (2006.01)
*G01B 11/00* (2006.01)
(Continued)

(52) U.S. Cl.
CPC ............ *B05B 12/124* (2013.01); *B05B 12/00* (2013.01); *B05B 12/122* (2013.01); *B05B 13/04* (2013.01);
(Continued)

(58) Field of Classification Search
CPC ... B05B 12/004; B05B 12/008; B05B 12/084; B05B 12/12; B05B 12/122; B05B 12/124
See application file for complete search history.

(56) References Cited

U.S. PATENT DOCUMENTS 4,714,339 A    12/1987 Lau et al.
5,059,266 A    10/1991 Yamane et al.
(Continued)

FOREIGN PATENT DOCUMENTS

CN    2421082 Y    2/2001
CN    1583373 A    2/2005
(Continued)

OTHER PUBLICATIONS

European Search Report dated Feb. 2, 2011 as received in Application No. EP 10 17 8353.
(Continued)

*Primary Examiner* — Dah-Wei D Yuan
*Assistant Examiner* — Stephen Kitt
(74) *Attorney, Agent, or Firm* — Maschoff Brennan

(57) ABSTRACT

The invention concerns a handheld, dynamically movable surface spattering device, comprising at least one nozzle means for an expelling of a spattering material onto a target surface and a nozzle control mechanism to control characteristics of the expelling of the nozzle means. Furthermore, it comprises a spattering material supply, a storage with desired spattering data, which is predefined and comprised in a digital image or CAD-model memorized on the storage, a spatial referencing unit, to reference the spattering device relative to the target surface and a computation means to automatically control the expelling by the nozzle control mechanism according to information gained by the spatial referencing unit and according to the desired spattering data is evaluated and adjusted by changing the characteristics of (Continued)

expelling of the nozzle means in such a way that the target surface is spattered according to the desired spattering data.

30 Claims, 5 Drawing Sheets

(51) Int. Cl.
    *B05B 13/04* (2006.01)
    *B05B 12/00* (2006.01)
    *B05B 12/08* (2006.01)
    *G01S 5/02* (2010.01)
    *G01S 19/38* (2010.01)
    *H04N 13/02* (2006.01)
    *B41J 3/407* (2006.01)

(52) U.S. Cl.
    CPC .......... *G01B 11/002* (2013.01); *B05B 12/084* (2013.01); *B41J 3/4073* (2013.01); *G01S 5/02* (2013.01); *G01S 19/38* (2013.01); *H04N 13/0246* (2013.01)

(56) References Cited

U.S. PATENT DOCUMENTS

| | | | |
|---|---|---|---|
| 5,935,657 | A | 8/1999 | Melendez |
| 6,299,934 | B1 | 10/2001 | Manning |
| 7,180,660 | B2 | 2/2007 | Hauger et al. |
| 7,350,890 | B2 | 4/2008 | Baird et al. |
| 7,922,272 | B2 | 4/2011 | Baird et al. |
| 8,036,452 | B2 | 10/2011 | Pettersson et al. |
| 8,037,844 | B2 | 10/2011 | Mather et al. |
| 8,244,030 | B2 | 8/2012 | Pettersson et al. |
| 2005/0100680 | A1* | 5/2005 | Bustgens ............ 427/427.1 |
| 2005/0242205 | A1* | 11/2005 | Jarvis ............ 239/71 |
| 2007/0086021 | A1 | 4/2007 | Teichman |
| 2007/0209586 | A1 | 9/2007 | Ebensberger et al. |
| 2008/0152807 | A1 | 6/2008 | Baird et al. |
| 2009/0022879 | A1 | 1/2009 | Bustgens et al. |
| 2009/0179081 | A1 | 7/2009 | Charpie |
| 2010/0304009 | A1 | 12/2010 | Bausen et al. |
| 2011/0199431 | A1 | 8/2011 | Baird et al. |

FOREIGN PATENT DOCUMENTS

| | | |
|---|---|---|
| CN | 101422761 A | 5/2009 |
| DE | 101 38 167 A1 | 2/2003 |
| DE | 10 2008 015 258 | 9/2009 |
| FR | 2 785 230 | 5/2000 |
| FR | 2850322 | 7/2004 |
| JP | S48-9660 Y1 | 3/1973 |
| JP | S61-167965 U | 10/1986 |
| JP | H02-307730 A | 12/1990 |
| JP | 10-264060 | 10/1998 |
| JP | H11-104578 A | 4/1999 |
| JP | H11-267560 A | 10/1999 |
| JP | 2005-103420 A | 4/2005 |
| JP | 2006-320825 | 11/2006 |
| KR | 102006009588 | 2/2006 |
| KR | 100812725 | 3/2008 |
| WO | 82/00906 | 3/1982 |
| WO | 2005/018813 A2 | 3/2005 |

OTHER PUBLICATIONS

Extended European Search Report dated Aug. 31, 2012 in application No. 12160353.4.
"Tracking-interferometer", Wikipedia-de, Accessed Aug. 30, 2017, https//de.wikipedia.org/wiki/Tracking-interferometer.
Martin, Joel, "Quality 101: Laser Tracking Fundamentals", Quality Magazine (May 14, 2007).
Secula, Erik, "PML Expertise and Collaborations Lead to Portable Test Solution for Laser Trackers", NIST (Dec. 28, 2015), www.nist.gov/news-events/news/2015/12/pml-expertise-and-collaborations-leadportable-test-solution-laser-trackers.
Hamann, Roland et al., "Photogrammetrie Seminarvortrag: Laser Tracking", Bochum University of Applied Sciences (Oct. 2007).
"Laser tracker", Wikipedia, Accessed Aug. 30, 2017, https://en.wikipedia.org/w.index.php? title=Laser_tracker &oldid=790370403.
Bridges, Bob, "How Laser Trackers Work", Quality Digest (Jun. 25, 2009), https://www.qualitydigest.com/inside/twitter-ed/how-lasertrackers-work.html.

\* cited by examiner

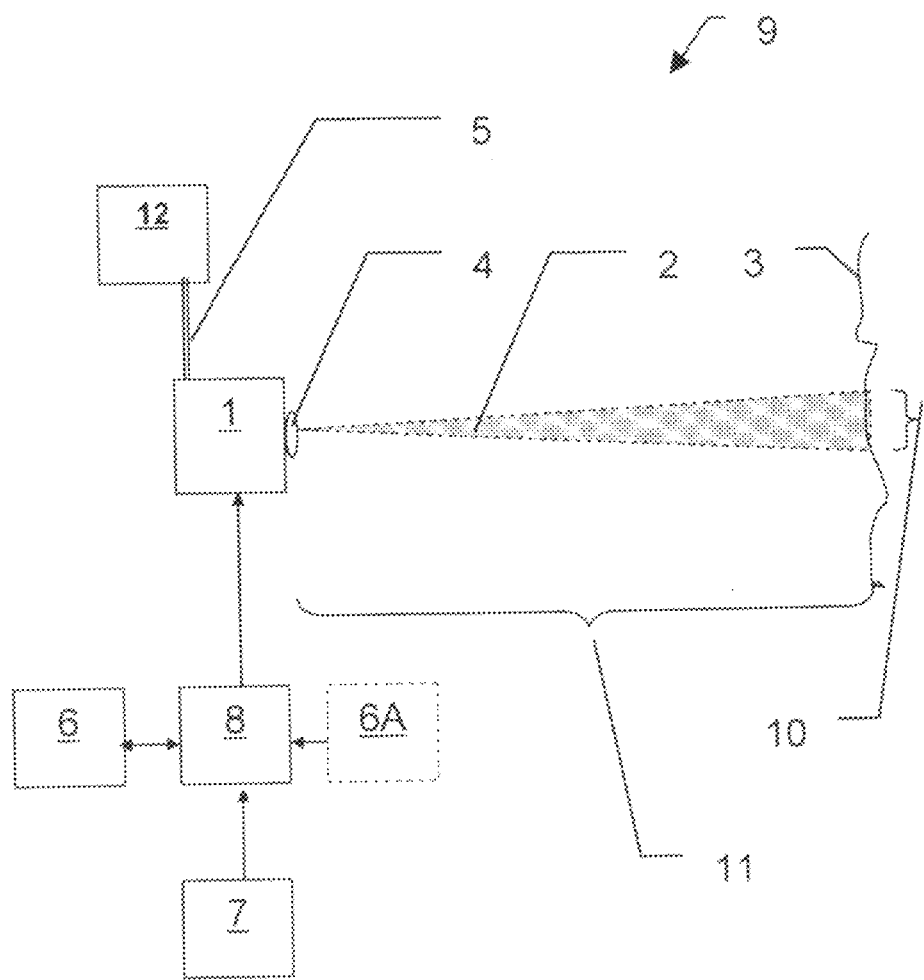

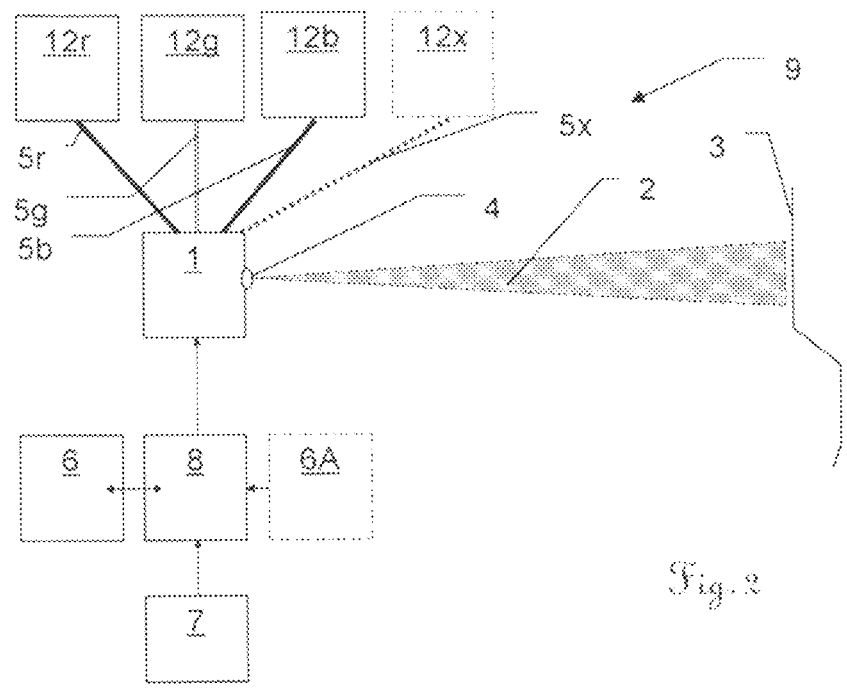
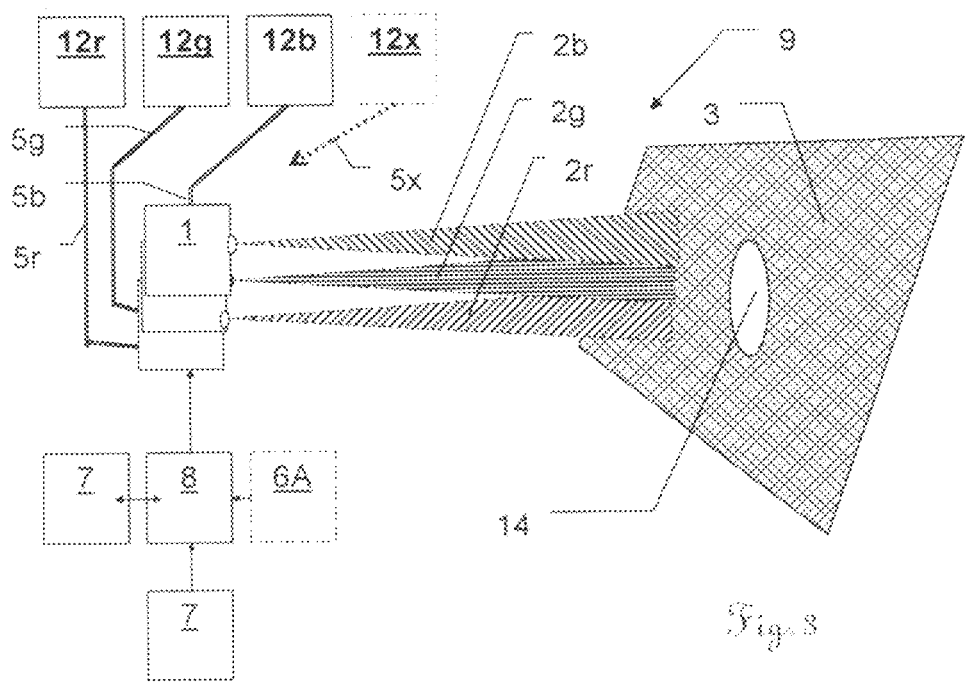

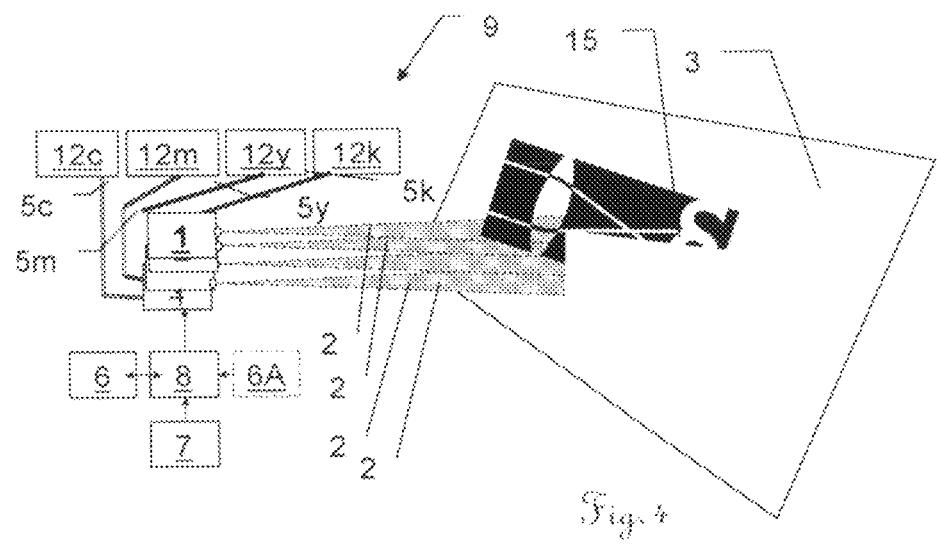
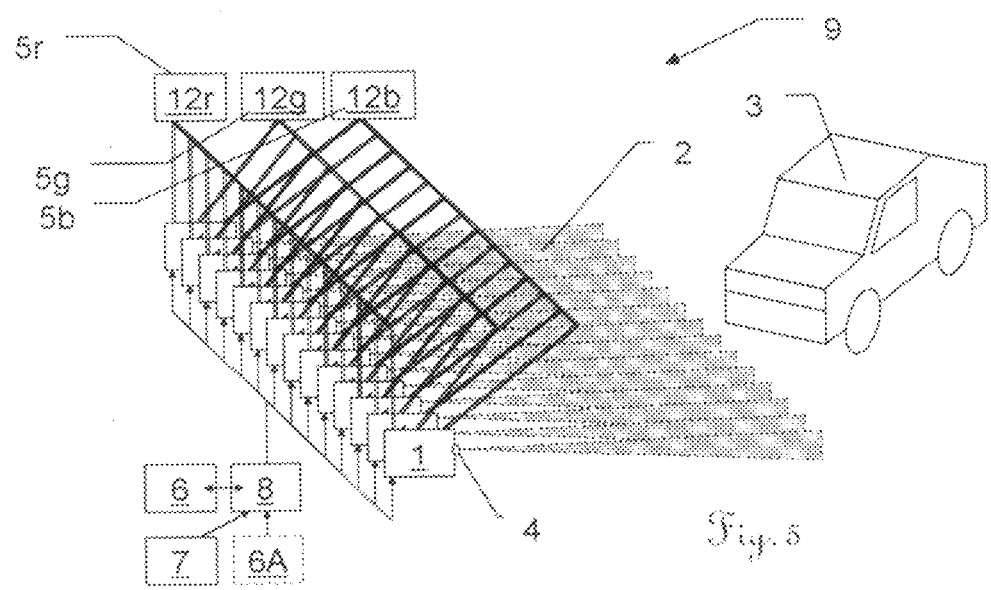

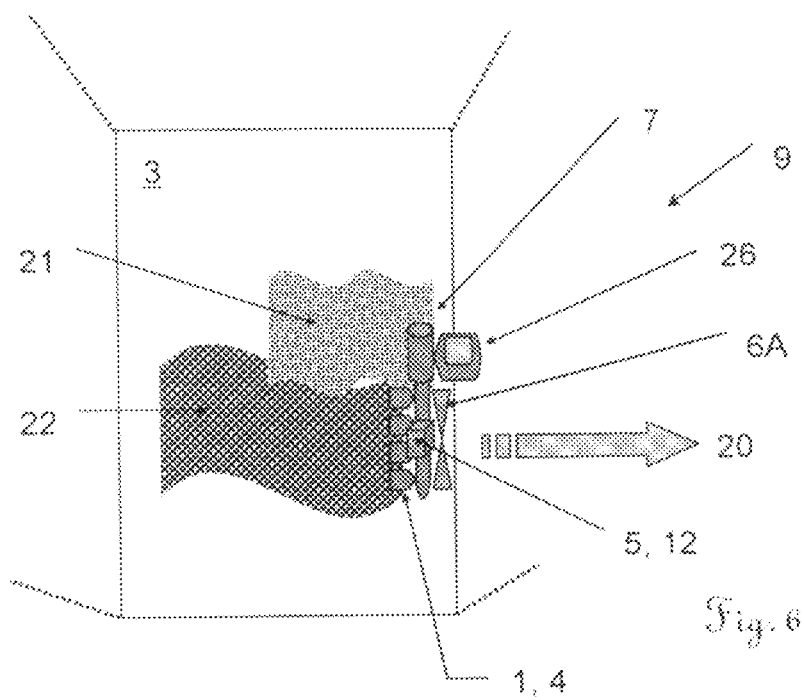
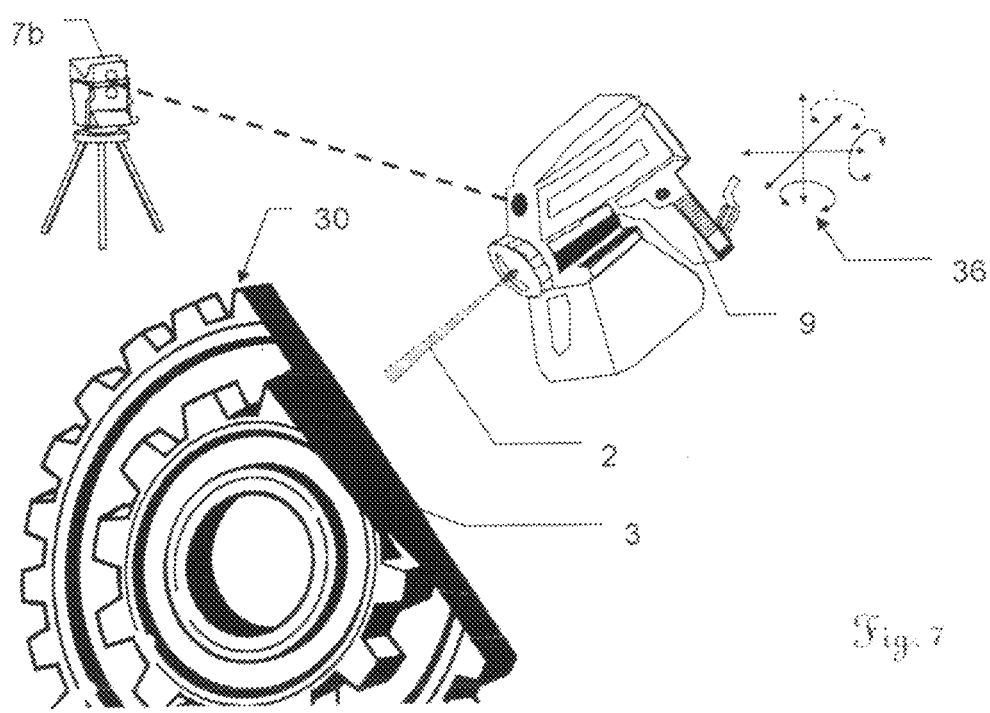

SURFACE SPATTERING DEVICE

FIELD OF THE INVENTION

The present invention relates generally to a handheld, dynamically movable surface spattering device, to a method for spattering surfaces, and to a computer program product.

BACKGROUND

The desire to apply a layer of spattering material onto a target surface is spread over a lot of different technological areas. There are various reasons for apply spattering materials to surfaces, with the most common being the desire to protect the surface against environmental influence or to fulfil aesthetic demands such as a smooth, uniformly coloured surfaces or the desire to apply certain, often multi-coloured, graphical patterns onto the surface or on certain areas of the surface. The spattering as a process can include or be painting, coating, plating, inking, cladding, varnishing, spraying, sprinkling, texturing, overcoating, colouring, tinting or staining by expelling material to be applied to a target surface from a nozzle means.

The technical areas wherein such painting, spattering, inking, dyeing or coating is desired, range for example from construction work, advertising, amusement, machinery building, road marking, markings on sport grounds, indoor and outdoor wall claddings, car manufacturing, furniture production, etc. Also, a repair of already—at least partially—spattered surfaces which are worn out, damaged, sabotaged, partly replaced, etc. is often required, wherein special care must be taken to achieve a high degree of colour matching and also smooth and optically uniform transitions from the old to the new spattering.

The most common types of spatterings are powder coatings and paint-sprayings by airbrushes or painting guns, but there are many other different types of spatterings like for example sprayed plaster as known from boat construction, sprayed mineral wool, sprayed or gunned concrete, sprayed asbestos, underbody coating as known from cars or other spatterwork. Also sandblasting is a very similar field of the art wherein, instead of covering a surface by spattering material, the surface is eroded by an expelled jet of, erosive material with almost analogous principles as used in spattering.

For example in the car industry, the usage of painting robots to paint sheet metal or body parts is common state of the art. The robots for fulfilling such tasks are programmed or taught for that purpose by skilled craftsmen.

The document FR 2 850 322 discloses a device for printing an image on a large surface that may be held and moved manually and is able to determine position and direction on a surface. The device uses this knowledge of its current position to determine which colour needs to be applied on the surface. This determination is accomplished by matching the determined coordinates and an image stored in a memory of the device. The stored image may then be superimposed to the surface to be painted.

In U.S. Pat. No. 6,299,934, a GPS controlled paint spray system comprises a paint sprayer driver program and a GPS paint sprayer. The GPS paint sprayer includes a GPS receiver, a geographical converter for enabling a user to convert a drawing pattern to geographical locations, a location comparator for detecting a location match between the geographical locations of the drawing pattern and a current GPS-based location, and a spray nozzle to spray paint at matched locations. Said geographical drawing pattern can be marked onto either a field, a wall, or a parking lot.

US 2009/0022879 relates to a method for applying paints or varnishes to large surfaces by means of a displaceable, paint applying device which is controlled in a position-dependent manner. Said device comprises a displaceable part of a real time position measuring system using reference marks.

KR 102006009588 provides a method for controlling injection position of a painting articulated robot to automatically operate arms positions of an articulated robot by remote control so that a painting material exactly injects to an object.

In JP 10-264060, a system is provided to perform teaching of movements to a robot arm—by anyone, easily and in a short time—to perform painting by maintaining a painting machine at a right location and attitude, regardless of the skillfulness of a worker. The advancing route of the painting machine is calculated by an image processor, and the location and attitude of the painting machine are calculated by a distance/attitude calculator, based on the output signals of an image sensor and distance sensors which are mounted at the tip of a robot arm. In a controller, the control parameter of each axis of the robot arm is outputted to a driving device and the control parameter of each axis of the robot arm, which is moved by the driving device, is stored in a storage device in time sequence, while a feedback control is performed so as to maintain the distance of the painting machine and the painting surface to a prescribed value, face the painting machine to the painting surface and move the painting machine along the advancing route.

JP 2006-320825 describes an automatic coating vehicle for painting, e.g. an aircraft, wherein the thickness of the paintwork has to be quite accurate—for once to achieve a sufficient protection of the surface on one hand and to keep the weight of the applied paint as low as possible on the other hand. It includes arm control means to control operation and movement of an arm with an actuator head, and to perform a painting process with respect to a surface to be coated based on the information of the coating area or region stored in a memory means and the attitude and position information of said arm. The position of the vehicle and the head are determined using a GPS, as well as a range finder for measuring a distance between the head and an object.

The document DE 10 2008 015 258 relates to a painting robot for painting motor vehicle bodies by means of a atomizer (also known as nebulizer) for spattering the surface, that is guided by the painting robot. Applying multicolour paint is realized using a paint changer.

FR 2 785 230 refers to a ground logo imprinting technique for graphical reproduction of a drawing reproduced on the ground. The technique traces contours on the ground from a computer driven optical system. The contours traced out are then filled in with jet paint pulverization. The ground logo imprinting technique produces a ground print of a predefined advertising logo or drawing. A stencil, formed by a computer integrated optical system is projected onto the ground and jet paint pulverization is applied to the ground surface.

In KR 100812725 a method for controlling the position and angle of a painting robot is provided to execute painting works at the same spray distance and the progressive speed of a spray target point within an orthogonal painting zone by controlling a spray gun at the proper rotational angular speed, access speed, and separation speed. The goal is to generate a uniform spraying on the surface.

U.S. Pat. No. 5,935,657 discloses a multiple nozzle paint spraying system with two separate banks of spray nozzles.

Both banks are supplied by paint from an airless pressurized source, and each individual bank has a shut-off valve to stop the flow of pressurized paint to that respective bank. The entire assembly is mounted on a roller stand which has a pair of arms extending laterally outward. During use, the painter merely activates the paint spray and pushes the apparatus along the wall. The lateral arms maintain the spray nozzles at a fixed distance from the wall, and a coat of paint can be applied to the wall uniformly and quickly.

The basic principle used in those surface spattering applications is to expel or eject a spattering material such as paint from a nozzle means onto a target surface. To achieve such, there is pressure built up inside or before the nozzle which forces the spattering material out of the nozzle or the spattering material is carried away by a jet of gas or liquid which is ejected through or next to the nozzle. The most common examples for doing so are the ones known from painting guns or airbrushes and the ones known from ink-jet printing.

New ink-jet printer like technology is available to paint with narrow spot sizes of less than one centimeter even from 10 cm distance. Such low divergence expelling techniques allow also spraying without masking, real-time colour mixing or colour changing over the area painted or colour fading from one colour to another.

The problem is to control such systems for the spattering applications described above, particularly in non-robotic, i.e. fully manually operated cases or also in cases when the painting tool is handheld and only partially supported by a guide rail or for example a weight compensating arm or the like.

Manually applying paint or powder to objects such as walls, industrial structures, manufactured products like car bodies, large machine parts, etc., as target surfaces is especially difficult in cases where just parts of the surfaces should get painted, for example after repairing or replacing damaged parts or overpainting certain areas only. Furthermore, painting a pre-defined pattern such as a logo or an image available as a picture or CAD file, which should be applied to a surface, can be quite demanding and when using an airbrush requires a skilled craftsman, who needs experience and knowledge in the guidance and reliable position and attitude handling of the spattering, painting or powdering tool as well as knowledge of paint viscosity, drying conditions and various other parameters during labour.

When using handheld or only partially guided spattering devices, which can take place inside or outside a building, a main problem which has to be overcome is the dynamics of manually driving the device over the surface to be painted, or in other words the user behaviour. Those dynamics can comprise rapid changes of distance, angle and speed of the painting or powdering tool in any direction relative to the target surface to be painted.

In case of repairing or adding paint to already painted surfaces, it can also be quite time consuming to find out the already present colour type and kind as well as the thickness in advance of labour and also to manage to buy or self-mix the matching colour, in particular while at the worksite.

Non-flat surfaces are a further challenge (3D) as well as sudden interruptions of the target surface which need to be spattered, for example walls comprising cables or pipes mounted on the surface to be painted.

SUMMARY

It is therefore an object of the present invention to provide an improved handheld surface spattering device which reduces the negative influences on the spattering which result from unsteady or non-optimal handling by the user.

A further object of the present invention is to provide an improved handheld surface spattering device which actively compensates the influences of non-optimal handling by the user.

A further object is to provide a surface spattering device which aids the user in fulfilling common spattering tasks and to achieve the desired spattering results and characteristics.

A special object of the invention is to aid a user in accurately applying a predefined spattering pattern onto a target surface by a handheld spattering device.

A further object of the invention is to provide a device which is capable of automatic adjusting its expelling characteristics dependent on the characteristics of the target surface such as e.g. target-shape, present spattering colour, present spattering thickness, present spattered and non-spattered areas, temperature, etc.

A particular object of the invention is to provide a device which avoids the need of pre mixing spattering materials to desired colour or material characteristics and also omit or reduce the thereby involved exchange and cleaning process effort.

Another particular object of the invention is to automatically adjust the expelling characteristics of the device, dependent on the present spattering task and the spatial location and movement of the device.

According to the present invention, the above mentioned drawbacks can be overcome by providing a handheld, dynamically movable surface spattering device, comprising at least one nozzle means for an expelling of a spattering material onto a target surface. The expelling can be continuous, resulting in an uninterrupted stream of spattering material, or pulsed by ejecting small separated portions or drops of material, whereby in case of high pulses-repetition frequency the pulsed-ejection can also be interpreted as a quasi-continuous stream of spattering material.

The spattering device also comprises a nozzle control mechanism to control characteristics of the expelling of the nozzle means, in particular expelling-direction, -speed, -divergence, -spreading, -shape and/or -material rate, pulse timing, pulse duration and pulse repetition. For providing the spattering material to be ejected, the spattering device comprises a spattering material supply which can be linked to an internal or external material tank. The spattering device furthermore comprises a storage with desired spattering data, which can be embodied as fixed installed memory means, as a slot for receiving a memory card, USB-Stick or the like as well as wired or wireless network storage. The desired spattering data is predefined and comprised in a digital image or CAD-model memorized on the storage.

A spatial referencing unit is comprised, to reference the spattering device relative to the target surface, in particular in at least five degrees of freedom by position, angle and/or inertial determination means such as an Inertial measurement unit (IMU), an Electronic distance meter (EDM), a Geodetic instrument, a Stereographic camera, a 3D-Scanner, and/or reference marks for a spatial referencing unit placed externally of the spattering device.

A computation means to automatically control the expelling by the nozzle control mechanism according to information gained by the spatial referencing unit and according to the desired spattering data.

The computation means is built in such a way that an actual or forecasted spattering spot, as the actual of forecasted spatterable area on the target surface, which spattering spot is dependent on the actual or forecasted spatial reference of the spattering device, the actual or forecasted set of characteristics of the expelling of the nozzle means and a actual measured, calculated or forecasted distance and inclination of the nozzle means relative to the target surface, is evaluated and adjusted by changing the characteristics of expelling of the nozzle means in such a way that the target surface is spattered according to the desired spattering data.

The characteristics of expelling of the nozzle means is controlled according to a determined presently spatterable area on the target surface, which is dependent on the spatial reference of the spattering device, the direction of the expelling of the nozzle means and a measured distance from the nozzle means to the target surface, in a way to achieve a spattering of the target surface according to the desired spattering data.

The computation means is built in such a way to control the nozzle means for an unmasked application of the spattering material to the target surface according to the desired spattering data by the hand guided device.

Besides an expelling of spattering material by pressure which is used to force the spattering material out of the nozzle means, there are other systems that are "throwing" drops of spattering material, in particular with a very high frequency.

Other expelling systems are "sucking" the spattering material out of the nozzle means by a bypassing jet of air or gas building up a negative pressure and carrying away the spattering material.

In particular, the presently spatterable area can be defined as the portion of the target surface that would be hit by a then expelled spattering material in form of a drop, a stream of drops or a continuous stream of material from the nozzle means towards the target surface in the present direction of expelling and the present divergence of the stream as examples, of characteristics of the expelling.

In case the divergence of the expelled spattering material jet is unequal to zero the size of presently spatterable area on the target surface is dependent on this divergence and on the distance between the nozzle means looked at and the target surface. The shape of the presently spatterable area on the target surface can further be dependent on the inclination of the direction of expelling relative to the target surface.

In one of the simplest embodiments, this could be a handheld painting gun which automatically adjusts the expelling characteristics of the nozzle(s) according to the distance and/or inclination to the target surface to achieve a uniform coating of the target surface by the spattering material.

In another embodiment, the spattering process can for example further be observed by camera to verify the progress and the desired result, for example by monitoring the full coverage of the desired area on the target surface and if required the expelling characteristic can be adjusted in such a way to achieve the desired spattering results.

A more advanced task is the spraying of a paint pattern such as a logo of a company, advertising graphics or other textual or graphical items onto a target surface by manually running the painting device over a wall, ground, ceiling, sheet metal or another target object. According to the invention, this can be done indoors as well as outdoors, in particular by an unguided, handheld device which allows easy handling and movement also at remote sites. In case of rechargeable batteries and/or air tanks, it is also possible to use such a device even in difficult to access or remote areas where not even a power supply is available.

In a basic version, the device determines the spatial reference such as current coordinates, attitude, and/or distance to the target object, and decides whether or not to expel or spray spattering material, in particular paint based on this spatial reference. In the decision whether to spray paint or not, the device can also incorporate further information like whether the present area has already been painted or should remain unpainted.

To gain this further knowledge, the spattering device can comprise a data storage wherein a history of locations of already spattered areas is stored online while spattering. The storage can also comprise the desired spattering data, which can be stored as a desired pattern to be applied to the target is spatially dependent. So desired spattering data does not mean information regarding a plain, smooth, uniform covering of a target surface with a single spattering material, as e.g. in classic paint gun spraying of single coloured car bodies, but a spattering more comparable to the art of airbrush painting for applying patterns like in colourizing model making, billboard painting, text or lettering applications to surfaces or the like.

The control of the spattering process, which is dependent on the expelling of the spattering material, which is done by a means herein referred to as nozzle, has certain characteristics like expelling direction, divergence, pressure, speed, material rate, etc. some of which can be fixed as well as variably controlled by a nozzle control mechanism. In a simple case, this is an on/off control, but there are many advanced methods known to influence the expelling, in particular in the technical area of airbrushes, painting guns or ink-jet printing.

The control of the spattering process can further be dependent on information regarding the presently used spattering material which information can comprise colour, type, viscosity, etc. This information can either be entered manually or determined automatically.

The desired pattern to be applied to the target can be based on a digital CAD like design of the pattern. If necessary, for example in case of curved target surfaces or surrounding or objects, which define where to start spattering, where to stop, etc. can also be comprised in the digital design or model, which can be represented in a two or three dimensional model.

The spatial referencing allows to avoid painting colour to areas where it has already been applied or where it should not be, wherefore the device can store the areas already painted in a real-time manner, for example also by an overlay of the original CAD data projected on a display or on the target.

The spattering device can comprise a single or multiple nozzle means, e.g. aligned in rows or spraying bars, as shown in FIG. 3.

The nozzle control mechanism allows adjusting each single nozzle in a short reaction time. To reduce the influence of the still remaining reaction time, the control-algorithm for the nozzles can comprise a prediction of the reaction time. In other embodiments, the nozzle characteristics can also be adjusted for multiple nozzles by a single actuator.

The high dynamics and uncertainties of the hand guidance can be overcome or at least reduced by a correction of the expelling characteristics like painting pressure, jet width and direction in real-time. The direction can be adjusted either by angular adjustments of the nozzle expelling direction, in particular by some mechanical micro drives or by adjusting the nozzle shape or injecting air from the sides. Also, the shape of the ejected stream of material can be influenced by the nozzle control mechanism, for example by hydrodynamic means like injecting air from different sides to shape the jet of spattering material into a desired profile or direction or by mechanical means like shaping and/or moving the nozzle.

In addition to spatial location referencing, i.e. local 1D (distance), 2D or 3D spatial referencing or geo-referencing with or without determination of the inclination, also the speed and/or accelerations can be evaluated and incorporated in the controlling process. Beside the simple form of a spatial dependency of the target distance only, general hand held devices use a spatial referencing in 5 or 6 degrees of freedom (DOF), wherein a fixed guidance in one direction or orientation can also be considered as a referenced degree of freedom.

To achieve the desired spattering results, knowledge about the type, kind, colour and/or viscosity of the spattering material as well as environmental the parameters influencing the drying or curing of the spattering material can be incorporated in the automatic control of the nozzle's characteristics as explained in detail below.

Controlling the dynamics of the manual driving of the handheld tool, in particular changes of distance, angle and speed of the painting/powdering tool relative to the surface to be painted, leads to adapting the spraying power, pressure, jet width or direction of a nozzle (if those characteristics are variable in this special tool).

In case of a multiple nozzle device the coordinate, direction and/or distance to the target surface of each of the nozzles can be determined to individually adjust each nozzle characteristic. This can be done by a sensor for position and orientation being of a bar type as well.

For a single nozzle, it can be sufficient to only determine one coordinate, direction and/or distance.

Multiple nozzle or injection systems that work like magnified inkjet printers allow to apply colours by applying a set of primary colours like RGB, CMYK, HSV, etc., which may be extended by some special colours like black and white, or spot colours like gold, silver, clear coatings, etc. The colours to be used for a certain task can be defined according to the desired range and variability of the desired output colours.

Nowadays, there are spattering material ejection systems available on the market, which allow spraying a spot of, spattering material in an expelling direction with a spot diameter or size on the target of less than one centimeter from a distance to target which is greater than ten centimeters. The actual sizes of the spots can be adjusted not only by varying the target distance, but also by adjusting the expelling-characteristics of the nozzle which releases the spattering material. This can, for example, be done by varying the expelling pressure, the amount of expelled material, expelling speed, the geometrical shape of the nozzle, by supporting air-jets, etc. which influence the divergence and shape of the spot on the target.

So even in case of varying distances, which can be calculated or measured as described further below, it is possible to achieve a desired spot size on the target surface. Those spots can be ejected with high repetition rates of hundreds of spots per second or even more.

Those new expelling systems can also have advantages regarding the mist-development known from airguns and the resulting health issues and the contamination of the environment which should not get spattered. Also, the need to protect the environment from an undesired escape of spattering material by coverage can be reduced or omitted. Another aspect is an increased utilisation of the spattering material and resulting in reduced costs, environmental pollution and health issues.

The different colours can be applied in a spot cluster or dot-matrix next to each other onto the target surface which can e.g. be a wall, ground, object etc. to achieve either an actual mixing of the colour-material by overlaying the colour spots on the target surface or to achieve the desired colour by aligning small spots of different colours in different sizes, distributions or density next to each other to get the desired colour impression when observed from distance, e.g. as known in the art of paper-printing.

Such systems also allow spraying without masking. For certain patterns that are pre-defined (e.g. by a CAD-drawing) the colours can be mixed beforehand and then loaded into the paint tank which stores the spattering material. The multiple nozzles or injection system can have more than one row of nozzles, for example two for dual colour, three or more for multiple colours. It is possible, but often not necessary, to use a nozzle row for each colour needed in the present design since a mixing of three or four colours (e.g. CMYK—cyan, magenta, yellow plus black; or RGB—red, green, blue plus black; if applied to white ground as known from inkjet-printing) is enough to mix a broad range of colours.

When using pre-mixed colours that should cover the target surface homogenously, a corresponding number of nozzle rows all expelling the same colour can be used to cover not only a small spot, but also a wider range on the target in one stroke. As the nozzles can be controlled individually, the overall expelling characteristics can be adjusted dependent on the target's shape and desired spraying pattern, e.g. by deactivating certain nozzles or adjusting their ejection width/divergence.

An additional mixing of solvent to achieve a desired viscosity of the spattering material can also be done. Furthermore, an ejection of pure solvent can be used for cleaning purposes of the target surface or of the spattering device or of both of them. This can be done, for example, by one or more valves which allow a selection between spattering material and/or solvent.

If a spattering material is used which is curable by certain environmental influences like ultraviolet radiation or heat, the spattering device can be equipped with a source for such, e.g. an UV-lamp or infrared radiator, which can also be embodied by a laser-source which—at least roughly—covers only the spot which is presently being spattered or had just recently been spattered.

Another kind of spattering material can require a mixing of two or more components to cure. The mixing of those components can either take place inside of the spattering device, in particular inside of the nozzle, or outside in front of one of the nozzles for each of the components or directly on the target surface. For example, it is possible to parallelly spray a fiber material and two components of a two-part-epoxy material like polyester for spattering a target with fibre-reinforced-plastics like GRP or fibreglass. Optionally, the mixing of those three components can also take place inside one nozzle, which then expels the already mixed spattering material.

Other spattering materials can require a pre-heating to liquefy, such as e.g. thermoplastic or wax, whereby the nozzle and the spattering material supply need to be heated, and in some cases also the spattering target needs to be heated, e.g. by infrared, rays in particular by a laser-beam in a similar direction as the ejected spattering material.

In case of multiple-layer-spattering, which is quite common in painting applications, there are not only the dynamics of the device's movement but also the time difference between the paint or powder application to the surface which have to be handled. This can be done in conjunction with a determination of environmental condition parameters for the spattering material drying or curing, such as temperature of the air and/or of the target surface (e.g. measured by an infrared sensor), wind speed and/or humidity.

Other sensors can be comprised to measure e.g. the viscosity, consistence, and/or flow rate of the spattering material. For that purpose, corresponding measuring sensors can be comprised in the device or placed in the environment of the spattering tool and the target surface which then transfers the measured parameters to the tool control.

As mentioned above, the feedback control can be based on context based parameters such as the current position, attitude and user dynamics, which can be used for correction and prediction of the position and declination, and the environmental parameters as well as on a path-planning. The path-planning can be based on the desired spattering data which comprises information about the desired pattern of paint or powder on the target. The spattering system can, based on the desired spattering data, determine an optimized path and procedure for the present spattering task, which can be used for guiding the operator to generate the pattern on the surface. The planning can also help to apply multiple layers of paint subsequently. Thereby the aspects and parameters relating to the surface condition or paint type such as colour, viscosity, kind, drying/curing time, etc. can be included in the optimisation process as well.

A planning tool can support the operator in preparing and simulating the procedure. The planning can be executed on a remote Computer or be comprised within the spattering device itself if it comprises an according input and output means for user-interaction.

The planning can be done in advance of the work based on already available digital data or by a first scanning of the target, a second planning which might comprise graphical simulations and a third execution of the spattering task. The planning can also be done online and interactively during the actual spattering process, which in particular allows reacting to unforeseen obstructions or uncertainties of the target surface to be able to either react automatically or to inform the user of possible problems.

The planning can also include information regarding sudden or unexpected interruptions on the surface which can be determined using e.g. a CCD camera, RIM camera, laser scanner or stereo picture methods.

To guide the operator on a desired and/or optimized path, the device can be equipped with some simple symbol lamps for indicating the desired direction of movement to the operator. The desired movement can also be indicated by symbols on a display. To guide the operator, for example also the present deviation from the desired path can be indicated to ease keeping the spattering device inside a range of the desired spattering area which the device being capable of automatically correcting or compensating the deviations according to the invention.

It is also possible to overlay the desired CAD-data or picture with the reality. This can be done on a display by overlaying an image of the real world, captured by a camera with the desired data and/or instructions to the operator.

It is also possible to project symbols or parts of the CAD data or image directly onto the surface to be painted, at least around the current working area.

It is also possible to indicate the desired movement by acoustic signals like beeps or voice instructions as well as by haptic means.

Sensors for determining the distance, position, attitude and/or direction of the spattering device or more accurately of the nozzle(s) of the spattering device relative to the surface can be a GPS for positioning outdoors in two or three dimensions, or the direction when using two antennas or even attitude when using 3+ antennas. For the spattering task of the present invention, the usage of some known GPS-accuracy enhancements like DGPS or RTK-Stations can further increase the performance and accuracy of the spattering device.

Beside global positioning systems (GPS), also local positioning systems (LPS) can be used which are based on similar principles, but with the "satellites" embodies as locally fixed (base-) stations attached to the ground or another object like a wall, ceiling, tower, roof, tripod, etc. which are sending and/or receiving electromagnetic waves for position determination. Such LPS systems can for example also be used inside of a building or in situations where not enough orbital satellites are in view. Furthermore, the position accuracy can be increased in LPS compared to GPS.

Also, laser trackers, such as e.g. a Leica T-MAC can be used, wherefore the spattering device will be equipped with target means for, the determination of its position and attitude. Such a system can be used outdoors as well as indoors.

One or more laser scanners or other 3D-scanners can also be used, which can be comprised in the spattering device to directly or indirectly geometrically reference the device against the target surface or other reference objects, reference points or reference marks. The laser scanner(s) can also be stationed at a reference point external of the spattering device, for measuring the position/orientation of the spattering device and/or the target surface. In the later case, the measurement information can be transmitted to the spattering device by wire or by wireless means. When using such an approach, it is not only possible to determine the distance from the device to the target surface but, for example, also to detect obstacles or interruptions on the target surface, which can then be avoided or handled especially according to their shape.

The spattering device can also comprise an inertial measuring unit (IMU) which can determine at least a subset of position, speed, acceleration and attitude in 3D-space.

Another solution is the usage of one or more cameras for determining properties of the target surface. A single camera e.g. is capable of determining interruptions on the target, determining areas already painted or checking the results as painted. Also, simple triangulation based distance and/or attitude measurements can be executed based on the camera image, in particular in combination with a projection of some pattern onto the target surface whose shape and/or scale will be distorted dependent on the distance or attitude. By the use of multiple cameras, it is also possible to use stereographic methods for determining the position and/or attitude relative to surface or another reference object.

A range imaging measurement (RIM) sensors can be used to determine a 3D model of the target surface in advance of or while spattering the surface, and besides a spatial referencing comprising position and attitude, this sensor also allows the detection of interruptions, and imaging of the spattering progress can be established.

It is also possible to determine the location and/or attitude of the spattering device relative to the target surface by mechanical means, for example by attaching the spattering device to an articulated arm or the like.

The coordinates can refer to an independently defined global, regional or local coordinate system or to one being related to the target surface, e.g. for an object of accurately known geometrical shape, such as a manufactured product like a car body, or a new building whose walls have to be painted.

Also, an electronic distance measurement (EDM) device or laser rangefinder can determine the distance to the target surface to adapt expelling characteristics according to the invention. By the usage of multiple EDM or deflecting its measurement beam, it is not only possible to determine the distance but also the inclination relative to the target surface.

It is clear for a skilled person that the above mentioned laser-devices can also be replaced by devices based on signals with other wavelengths than light, such as radar, ultrasound, infrared, radio-signals, or the like.

Furthermore, a plurality of different combinations of the above mentioned spatial referencing methods and devices can be used, such as e.g. GPS plus IMU plus compass plus inclinometer for outside applications, or an ultrasound based electronic distance measurement unit to determine the distance to the target in combination with a RTK-corrected GPS position to achieve a global referencing, etc.

Another example would be a combination of an LPS for spatial referencing relative to the target surface with a EDM for target distance determination, which could for example also be extended by an IMU for handling the dynamics of movement.

A common task is also the repair of painted surfaces. Repairing means spraying paint of the same type onto a wall, ground, ceiling or an object which had been previously spattered, but its paint has faded, vanished or was demolished by some accident or repair work.

According to the present invention, the type or colour of the paint can be real-time determined on the target during work. This requires sensors determining at least the colour, if possible also the type or even the thickness of the paint on the target. For example, this can be done by a calibrated CCD/CMOS camera for colour or by paintmeters for sheet metal paint thickness determination, as they are known in the art.

To determine the colour it can also be advantageous to illuminate the target by a light source which covers a broad spectral range, which is also advantageous for the operator to oversee his work, even when no camera or automatic colour determination is used. In case of a damaged or different paint, e.g. to mend scratches or graffiti, those disorders can be detected and also the previous colour can be determined (or specified by the operator, a CAD-system or database).

The determined colour can then be mixed and loaded or mixed online by the spattering device. The correct colour will then be applied to the area to be overpainted or repaired, which area can e.g. also be determined by a sensor like an optical camera. To determine the area which needs to be repaired it is also possible to determine the thickness of the present spattering to decide whether new or additional spattering material has to be applied to the surface.

When the spattering device is equipped with a dedicated nozzle for sandblasting, the scratched area can e.g. also be prepared, cleaned and "sandpapered" in advance of applying new spattering to the scratched area, by one single spattering device.

As known for single nozzle systems such as paint robots or manual spattering workstations, the multiple nozzle device or especially the inkjet-like device can be moved over the target area or surface by using some kind of mechanical-support unit, like a robot arm or guide-rail based linear (1D, 2D or 3D) moving robot. There are also arms or string guides known which are for mechanical support only, but which can also be articulated, allowing the determination of the spattering device's position. Such supports can e.g. also comprise a compensation of the gravity of the spattering device, allowing a manual surface spattering which requires almost zero force from the operator, whereby for time consuming spattering tasks the tiring of the worker can be reduced.

When using such mechanical supports, position and attitude can partly or fully be determined by sensors comprised in the spattering device and/or by the support unit or, if present, by a motorization system as well, if the support allows sufficiently accurate positioning or position determination of the spattering device.

As the posture can be determined in all directions, no mechanical support is needed to run the device e.g. parallel or in the same inclination angle over the target area or surface.

To avoid damage to the surface, the rollers of prior art can be substituted by proximity sensors, directed to the target surface. The output of those proximity sensors can then be used either to guide the operators hand or to adjust the expelling characteristics of the nozzle or both.

BRIEF DESCRIPTION OF THE DRAWINGS

The method according to the invention and the devices and setup according to the invention are described or explained in more detail below, purely by way of example, with reference to working examples shown schematically in the drawings. Specifically, FIG. 1 shows an example of a possible embodiment of a spattering device according to the invention which comprises a single nozzle means for expelling a single spattering material;

FIG. 2 shows an example of a possible embodiment of a spattering device according to the invention which comprises a single nozzle means for ejecting multiple spattering materials or mixtures of those spattering materials;

FIG. 3 shows a further example of another embodiment of a spattering device according to the invention which comprises multiple nozzle means, each for ejecting a certain spattering material;

FIG. 4 shows an abstracted view of an embodiment comprising a row of nozzles according to the invention;

FIG. 5 shows an example of a possible usage of a handheld spattering device according to the invention in a wall-painting application;

FIG. 6 shows an example for additional sensors in a spattering device according to the invention;

FIG. 7 shows an exemplary embodiment of a surface spattering device according to the present invention, in a handheld 3D printing application;

Figure 8:
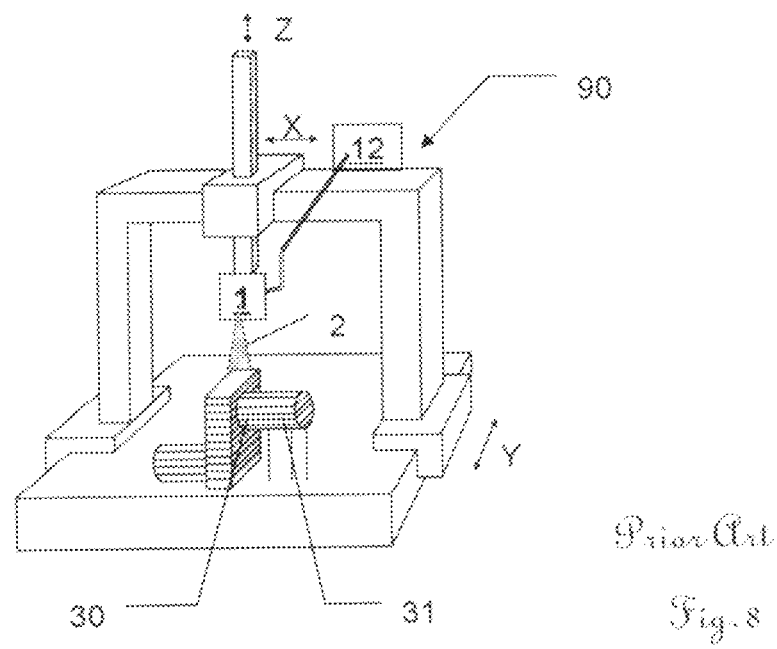
FIG. 8 shows a prior art, Cartesian 3D printing device and its application.

The diagrams of the figures should not be considered as being drawn to scale.

DETAILED DESCRIPTION

FIG. 1 illustrates an abstracted view of an embodiment of a handheld surface spattering device 9 according to the invention which comprises the following parts:

A nozzle means 1 which is designed to expel, eject or spray a spattering material 2 onto a target surface 3. The nozzle means 1 comprises a nozzle control mechanism 4 to control expelling characteristics (or characteristics of ejection) of the nozzle means 1.

The expelling characteristics influence the shape and/or direction of the expelled jet of spattering material 2, which can, for example, be defined by parameters like direction, jet-shape, jet-divergence, pressure, speed material rate, emerging speed, aggregate state and/or composition of the expelled spattering material, etc.

The spattering material 2 (the reference sign actually indicates a jet of expelled spattering material) can be of different nature, e.g. liquid, solid, gaseous or of mixtures of those states. Common examples of spattering materials are paint, finish, lacquer, ink and powder, but also concrete, wax, plastics, asbestos, sand and many more can be expelled according to the invention. The spattering material 2 is supplied to the nozzle means 1 by a spattering material supply 5 which can be embodied as storage 12, such as a tank or container, which is located at the spattering device 9 or as a pipeline from an external spattering material storage 12.

The target surface 3 can also be embodied by different objects like sheet metals, walls, floors, grounds, ceilings, roads, machinery, car or airplane bodies, boat hulls, clothes, etc. The target surface 3 can also be limited to certain areas of the mentioned objects. The target surface can be of any shape and also comprise edges, corners, concavities, obstacles, etc.

The expelled jet of spattering material 2 which is directed to the target surface 3 results in spots of spattering material 2 on the target surface 3. The spot can be characterized by its shape and spot size 10 on the target surface 3 which is dependent on the characteristics of the expelling and the distance 11 between the nozzle means 1 and the target surface 3, as well as on the inclination of the expelling direction relative to the target surface 3.

The nozzle control mechanism 4 to control the expelling characteristics of ejection of the nozzle means 1 resulting in different expelling characteristics can vary from a simple on/off switching of the expelling to a control of a multiple of the mentioned expelling characteristics by mechanical and/or aerodynamical means which can, for example, be adjusted by motors and/or valves, in particular micro-motors and/or micro-valves. As the expelling can also be initiated by piezoelectric, thermal or other effects, these can also be influenced by the nozzle control means, as well as for example the pressure or flow rate of the spattering material supply 5.

The computation means 8 controls or regulates the nozzle control mechanism 4. It can be embodied as a microcontroller, an embedded system, a personal computer or also in form of distributed system where the actual hand held spattering device comprises only a basic computational unit which can establish a communication link to another computation means which can for example have more capacity and performance than the one inside of the handled device, such as a personal computer, laptop or workstation. The communication link can be established by wired or wireless means.

The computation means 8 comprises or is connected to at least one storage which can be embodied as a RAM, ROM, hard disk, memory-card, USB-Stick, or the like, which can be either fixed or removable or a combination of both.

The storage is built in such a way to memorize the desired spattering data 6, which can be a CAD drawing, vector graphics, a bitmap picture (compressed or uncompressed) and also might even comprise tree dimensional information.

In case of a contorted, curved or uneven target surface 3 which needs to be spattered, the spattering data can—beside a two dimensional artwork information—also comprise further information on the three dimensional fitting of the artwork onto the surface.

Another embodiment which comprises desired spattering data in 3D can build up a three dimensional spattering, in particular by multiple layers of spattering material 2, wherein the previous spattering can be seen as a new target surface 3 for the current spattering, in particular wherein the spattering is applied in multiple layers of spattering material 2. The handheld spattering device 9 according to the invention can be moved in more than three dimensions, which can bring advantage over the known 3D-printers or stereo lithography devices which are based in three orthogonal axes. Therefore, the layers according to the present invention are not restricted to parallel and equidistant slices as in conventional 3D printing, but the layers can be applied from various directions. Therein the actual target, surface of each spattering process can be inclined to the previous one. This can for example improve mechanical strength of the 3D object built up by the surface spattering device, as the layers can be shaped in direction of the mechanical stress which will be applied to the object when in use, or in other words the orientation of the spattering material layers can be arbitrary shaped and curved in such a way to achieve maximum strength in view of the expected load distribution when the spattered object will be in use. So to say, the spattered layers according to the present invention can follow the tension lines, which is not the case in state of the art Cartesian 3D printing.

For example, a free movement in space of the spattering device 9 can allow applying spattering material 2 from different angles or even from underneath or through wholes which are not accessible by a three axis 3D printing system, wherein complex structures can be built up with a reduced need for supporting webs or bridges which afterwards have to be removed to result in the final 3D product. The application of three dimensional structures as desired spattering data can particular make use of the mentioned methods for curing the spattering material 2.

The user can be directionally guided in moving the device as discussed above to allow a handheld 3D spattering of highly complex structures from almost any side and angle of the object. For example an erected structure can be built up by spattering approximately from the top, whereas a sideways extension can be applied by spattering approximately from the respective side. Obviously, the direction of spattering does not necessarily has to be perpendicular to the direction of the structural part to be applied by spattering but can also be inclined to a certain extent. Limiting factors are a shadowing of the target surface to be spattered or such a flat spattering angle that the spattering material will not stick on the surface, which both obviously have to be avoided. Due to the handheld movement of the spattering device, above mentioned conditions are easily achievable, in particular by a automated user guidance, hinting the operator on preferred movement strokes which his hand should execute—at least approximate movements, since the nozzle control can take care of possible fine adjustments of the expelling. Also, a display of the desired object from the operator's point of view or an augmented reality display can be used as guidance aid.

The term target surface in this embodiment can be a surface of an already created part, sub-part or cross-section of the desired 3D object on which a further building up is required. The orientation of such a surface is not limited to parallel planar slices, as in common rapid prototyping systems, but can vary during the spattering process by pointing the spattering device from certain direction, in particular in a direction being approximately at right angles to the surface. According to the present invention, the three dimensional desired spattering data can also comprise different spattering materials information, for example a body consisting of one material and a surface-finish consisting of a second material, both applied by the same spattering device.

In prior art handheld spattering devices were only capable of applying flat 2D coatings, mostly desired to provide an even and smooth, uniform coating of the target surface. The present spattering device goes beyond this, enabling not only a handheld application of desired two dimensional material distributions such a flat images, but also real three dimensional desired spattering patterns in form of reliefs or three dimensional objects.

Therein, not only the spattering device's position and orientation in space can be used as a basis for calculating the portions of the desired 3D spattering data still to be applied, but also the target object and the already applied parts of the desired spattering data can be observed, scanned or measured for determining the to be applied portion of the desired data and a preferred range of position and orientation of the device from which the application can be executed. Thereby the user can be guided to hold the spattering device in this preferred range of spatial coordinates and orientation for applying a certain portion of the 3D pattern. By the handheld approach according to this aspect of the invention, there is much more flexibility given than by the known, rigid, portal-based 3D-printers, while avoiding the costs of a complex robot arm guidance for enabling the same range of position and orientation flexibility as achievable by a light-weight handheld device as presented herein. The handheld concept also solves the problem of on sight construction or repair of 3D parts, which would often be advantageous but not possible with the big, inflexible and rigid prior art machinery for 3D printing tasks.

For example, ship-hulls, vehicle bodies, casings or parts of those can be spattered out of spattering material, e.g. fibre-compounds, thermoplastics, thermoset, sintering powder, or other spattering materials mentioned above, without the requirement of having a positive or negative mould, but just by hand-out of digital three dimensional spattering pattern data of the desired object supplied to the device from some storage means. The described curing unit for the spattering material can enable a rapid application of a next layer of material onto the previous one by immediately curing the spattering material after its application.

Also repairs of 3D structures can be executed by hand in this way, in particular by a spattering device capable of scanning the present 3D shape of the target object, matching it with a desired 3D shape and identifying shape defects like holes, bumps, etc. which have to be compensated or evened out by spattering material. For example, a two or three dimensional camera or a scanner can be used for gathering the present condition of the target. Also a marking of the to be spattered areas on the target surface can be achieved by a projection unit such as a scanning laser projector or image projector like an LDC-, DLP- or Laser-projection unit, which are nowadays available in small size, in particular when comprising semiconductor illumination means like LEDs or laser diodes.

A device according to this aspect could also be called a handheld 3D printing unit, which comprises a controlled nozzle means for expelling material, a spatial referencing unit and a computation unit, with storage for the desired 3D spattering data, for controlling the nozzle means according to the spatial reference and the desired spattering data. The device can further comprise a user guidance means for virtual spatial guidance of the user's hand which is holding the device.

The computation means 8 can also comprise or be connected to one or more human interfaces 26 like a display, screen, projector, touch screen, multi-touch screen, lamp, light, button knob, dial, joystick, speaker, microphone, etc. as well as providing machine interfaces for communication with further technical equipment.

The power for the spattering device 9 can be supplied by a cable or by energy storages such as batteries. The device can further be supplied with compressed air and/or spattering material which can be stored at the device or supplied by a remote means.

The computation means 8 can access spatial information from a spatial referencing unit 7. The spatial referencing can take place in a different number of degrees of freedom (DOF), for example in 3D in space with 5 or 6 DOF. The referencing can take place in a local coordinate system or in a superordinate or global coordinate system, e.g. by global referencing for outdoor applications. Dependent on the present spattering task, it can also be sufficient to reference only in 2D space, in particular if the spattering device 9 is guided in parallel to or on the target surface 3 to be painted or if the target distance 11 is determined by a support or by an additional distance measurement unit.

The achievable range and the required resolution of the spatial referencing unit 7 depends on the application which the actual spattering device is designed for. This desired range can vary from indoor, local, small area positioning with the expansion of some meters to outdoor, regional or global areas with an expansion of some tens or hundreds of meters for bigger paint projects like sports-grounds or road markings.

The spatial referencing unit 7 for determining the position and or pose can comprise a single or multiple sensors, for indoor and/or outdoor usage.

One possible option for outdoor applications is a GPS system, which can optionally be aided by an IMU, a digital compass and/or an inclinometer.

Another option is an IMU only, which can also optionally be aided by a digital compass and inclinometer.

Laser tracking equipment, as e.g. cheaper variants of the Leica T-MAC or other means to track a target object, can be attached to the spattering device or situated remote of the spattering device and can also be used for referencing or can be used in combination with other referencing means.

The spatial referencing can also be achieved or supported by one or more camera(s) for pose and or position determination. Such systems are also referred to as vision based tracking systems, e.g. using a single camera system or stereoscopic systems.

Furthermore, one or more range-imaging (RIM) sensor(s) can determine the relative pose and or position on the spattering device 9 or from a remote location. In the "remote" case, a sufficient real-time communication from the remote spatial referencing unit 7 to the computation means 8 which handles the nozzle control mechanism 4 has to be ensured, which allows handling the quite high dynamics of the hand guidance. Optionally, delays can also be—at least partially—compensated by a prediction or a lookahead, in which case e.g. information gathered from an IMU can also be helpful.

A laser scanning unit, either comprised in the spattering device 9 or placed remote and looking onto the scene and the spattering device 9 can be used similarly as the RIM, as described above.

A spattering device 9 according to the invention can also comprise rangefinder(s) or distance meter(s) based on radar, ultrasound, light, laser or radio waves which can be used for determining the distance to the target surface or—when using multiple rangefinders can also be used to determine a relative tilt with respect to the target surface. The distance-to-surface sensors can be used for both 2D and/or 3D if arranged accordingly.

The system can also be supported by orientation sensors (pose) for 2D and/or 3D.

If the spattering device 9 is attached to one or more articulated arm(s) the spatial measurements of the arm(s) spatial coordinates can also be used to reference the spattering device according to the invention.

An embodiment of the spatial referencing unit 7 can be a passive, which means non-motorized, articulated arm, to which the surface spattering device 9 can be attached. For achieving a positioning of the surface spattering device 9 relative to the target surface 3, the articulated arm and/or the surface spattering device 9 can be equipped with a tactile probe or an optical distance sensor, like an EDM, to measure the spatial structure of the target surface and allowing the calculation of the relative spatial information between the nozzle means 1 and the target surface 3 which information can be comprised in controlling the characteristics of the expelling of the nozzle means 1. If a digital 3D model of the surface exists, it is for example also possible to define the target surface 3 by spatially measuring characteristic points of the real world embodiment and matching them to the corresponding 3D model and thereby referencing one or more target surfaces 3 relative to the spattering device 9.

The embodiment of FIG. 1 illustrates a spattering device for expelling a singe spattering material 2 or mono colour paint, which is supplied as a pre-mixed spattering material 2 of the desired colour, viscosity, etc. from a spattering material storage 12.

FIG. 2 shows another abstracted view of an embodiment of spattering device 9 according to the invention. The nozzle means 1 in this figure comprises a mixing of multiple spattering materials 2 inside of the spattering device 9. In the illustrated example, there are three spattering material supplies 5r, 5g, 5b representing red, green and blue paint-materials supplied from the corresponding storages 12r, 12g, 12b. The different spattering materials can then be mixed inside of the nozzle means 1 to a desired composition, being controlled by the nozzle control mechanism 4, for example to achieve the desired colour, which will then be expelled by the nozzle means.

The dosage of each of the supplied colours can for example be achieved by valves, pumps with variable rate of delivery, or other known means. If required, some additional stirring up can be done to achieve a homogenous mixture. By mixing the different spattering materials from the supplies 12r, 12g, 12b, the spattering device 9 is capable of expelling a range of colours and also colour transitions automatically.

When referring to the term colour in this application, also other a mixtures of spattering materials can be meant which do not necessarily result in a change of colour, like e.g. a mixing with a curing agent, solvent or other additives.

There is also a further storage 12x with the supply 5x (drawn in dotted lines), which can for example comprise solvent which can be mixed to adjust the viscosity of the paint. In another example, the supply 5x can supply a clear varnish, a special colour which is not achievable by mixing (like black, white, gold, silver, etc.) or other additives to the spattering material, for example to achieve metallic effects, hammered finish, or the like. In other embodiments, the supply 5x can comprise substances to influence the curing or other characteristics of the spattering material 2.

The target surface 3 in this illustration comprises a step configuration which, according to the invention, can be automatically handled by the nozzle control mechanism 4, which is capable of adjusting the expelling characteristics of the nozzle means 1 to achieve the desired spot diameter on the target surface regardless of the change in distance and inclination introduced by the step. Besides a fully automated adjusting of expelling characteristics, the operator can also be guided or assisted to handle the device in such a way to achieve latter.

The embodiment of the spattering device 9 shown in FIG. 3 is also capable of spattering the target surface 3 which different mixtures of spattering materials 2r, 2g, 2b. The main difference with respect to the previous figure is that in this embodiment, there is a separate nozzle means 1 for each spattering material supply 5r, 5g, 5b (5x). The actual mixing of the spattering materials 2r, 2b, 2g takes place outside of the nozzle means, either on the way to the target inside the jets of material 2b, 2g, 2r or on the target surface itself by overlapping of the spots of each nozzle on the target surface.

The desired colour effect can also be achieved without an actual mixing of the spattering material, by aligning separate spots of different spattering material close to each other, so they result in the desired colour impression when watched from distance. This method of colour generation is also referred to as dithering in the art of inkjet printing. The number of different spattering material supplies 5 and therefore nozzles 1 is not limited to a certain number, but depends on the desired mixtures of spattering materials 2 which have to be achieved, which can for example comprise the colours red, green, blue, black and white to achieve a wide colour range. Also, other basic sets of colours as e.g. known from the mixing of colour range of the RAL-colour cards or subsets thereof can be used.

Besides a direct mixing of multiple spattering materials; the different nozzles 1 or one single nozzle 1 can also be used subsequently with different spattering materials 2, e.g. to alternatively apply multiple layers of polyester and fibres automatically in a subsequent manner by the same device. With a device according to the invention, it is thereby also possible to evaluate the already applied spattering thickness on the target surface 3.

In this example the target surface 3 is inclined relative to the spattering device 9 which, according to the invention can be detected by the spatial referencing unit 7 and consequently, the nozzle control means 4 can automatically adjust the expelling characteristics of the nozzle means 1 to achieve the desired spattering of the target 3, regardless of the inclination and/or distance and/or to only expel spattering material 2, when the desired result is actually achievable. Therefore, the device 9 can also store information of the already-spattered and/or still-to-spatter areas on the target surface 3.

The spatial referencing unit 7 or the desired spattering data 6 can also comprise or acquire information regarding the hole 14 in the target surface. This can for example help to avoid a waste of spattering material 2 and also a soiling of the environment behind the hole 14. Apparently, this principle is also applicable to obstructions, irregularities or singularities on the target surface other than holes.

In FIG. 4, there is a similar embodiment of a spattering device 9 according to the invention as in FIG. 3. This embodiment comprises a four colour CMYK (cyan, magenta, yellow, black) colouring system according to the invention which is capable of applying a multicolour pattern 16 defined by the desired spattering data 6 onto a target surface 3, e.g. a company's logo onto a building's wall or onto a parking lot. According to the present invention, this can be achieved without any masking of undesired spattering areas on the target surface, whereby productivity of the spattering process can be improved, since the masking process can be very time consuming and its quality has great impact on the overall spatterwork result.

According to the spatial referencing unit 7, the computation means 8 controls the nozzle control mechanism 4 to apply a pattern defined by a desired spattering data 6 onto the target surface 3, by adjusting the expelling characteristics according to the spatial orientation of the spattering device 9 relative to the target surface 3, in particular the relative spatial orientation of each nozzle means 1 to the targeted spot on the target surface 3.

In this embodiment, the nozzle control mechanism 4 can also fine-adjust the direction of expelling or ejection from the nozzle 1, e.g. by tilting the nozzle 1 or by influencing the expelled jet of material 2. Dependent on the spatial orientation and knowledge about the already-spattered and still-to-spatter areas on the target surface 3, the computation means 8 is capable of automatically deciding whether or not to release spattering material 2 to the presently targeted spot on the surface 3, or not. In this case, the presently targeted spot in the expelling direction of the nozzle 1 can also be fine-adjusted by means to deflect the present direction of expelling. The deflection can also compensate the tremor and uncertainties of a hand guiding. Furthermore, the nozzle control mechanism 4 can also be capable of adjusting the expelling divergence and/or the amount of expelled material 2 per time.

In combination with one of the previously mentioned colour-mixing-methods, the handheld spattering device 9 according to the invention is capable of applying multicolour spattering onto a target surface 3, which can be defined by the desired spattering data 6, e.g. provided as a digital artwork or image stored on a memory card. Such an image can be stored in form of a so called bitmap, comprising a matrix of predefined pixels which are defining spots of spattering material to be applied, and can also include information regarding the desired type or colour of material. The image can alternatively be stored in compressed form or in form of vector information (e.g. as in a CAD-file), text information, etc. which can be converted to a desired distribution of spattering material spots on the target surface by the computation means. The desired spattering data can be described as digital representation of a desired pattern to be spattered onto the target surface, comprising information on multiple areas or sections or subsections of the target surface which have to be spattered with different attributes, in particular different colour, spattering material, thickness, surface condition, etc.

FIG. 5 illustrates another exemplary embodiment of a spattering device 9 according to the invention, which comprises a row or line of multiple nozzle means 1. The illustration shows nozzles 1 for spattering material 2 mixing as described with respect to FIG. 2, but also the other described mixing methods are applicable in a row-arrangement in an analogous way.

By aligning multiple nozzles 1 in a row or bar or another arrangement, it is possible to at once cover a wide area on the target surface, while keeping the expelling divergence and target-spot-size low. The target surface 3 is represented by a car-body (not drawn to scale). The bar arrangement can also be used to compensate handling inaccuracies by expelling only from those nozzles 1 which are actually targeting a portion of the surface 3 which has to be spattered according to the desired spattering data 6 while deactivating the other nozzles 1.

The spattering or painting can take place during production of the car or also in case of repair or replacement of parts of the car's body. For example, in case of repair, a colour detection system at or external to the spattering device 9 can be used to determine the present and therefore desired colour of the vehicle to be repaired, which information can then be used to adjust the colour mixing system in the spattering device 9 accordingly to achieve the desired colour.

Furthermore, the spattering device 9 can manually, automatically or semi-automatically detect the desired area to be spattered, represented by spatial reference measurements for the definition of the desired spattering data. The desired area can also be provided in a CAD data model or by teaching the borderlines, edges or corners of the desired area to be spattered, e.g. by indicating the contours or edges of polygon surrounding the desired area, e.g. by a laser spot.

If the device is equipped with a 3D detection means, such as a RIM-camera, a laser scanner or the like, the target surface can also be scanned and presented as an image or 3d-model on a screen, on which the desired spattering area or data 6 can be selected and adjusted in advance of the actual spattering process, either at the device itself or on a remote computer device. Also, special patterns like logos, etc. can be virtually placed on the model or image of the target surface 3 by similar means.

Other examples to determine the desired spattering data are the online or offline measurement of the actual spattering thickness or an examination of the target surface 3 by imaging means e.g. to find colour differences or the like. The mentioned paint-thickness-sensors are e.g. known and used in the car or sheet metal area for determining the spattering thickness.

The spattering device can also comprise or interact with paint recognition sensors which are capable of determining colour, visual characteristics, type or state of the paint that was already applied long ago or that has just been applied to the surface. Common examples of such paint recognition sensors are e.g. digital cameras, infrared or ultraviolet cameras or sensors, eventually combined with a corresponding illumination system.

Another option is to equip the device with an electronic display or projection means which allows an overlay of the desired spattering data on a screen or the desired spattering data to be projected onto the target surface by a picture or laser-line projector.

FIG. 5 shows an embodiment of a handheld patting device 9 according to the invention for spattering an object comprising the target surface 3, which is equipped with additional sensor means.

The illustration shows a previous spattering 21 already present on the surface either for quite a long time or from the previous work session. In addition to this old spattering 21, a current spattering 22 needs to be applied to the target surface which can for example be desired to match the colour and surface characteristics of the previous spattering or which can for example be a graphical item to be overlaid on the previous spattering 21. To determine the characteristics of the previous spattering 21, a paint recognition sensor 6A can be comprised in or attached to the device 9.

To interact with the device 9, e.g. to select, arrange, modify, manipulate, create or define the desired spattering data 6 which does not only involve a selection of simple spattering parameters like spattering thickness, colour, target surface edges, etc. as required for a flat spray coating of the surface, but comprises rather complicated graphical designs. The spattering device comprises a human-machine interface 26 (HMI) which can, for example, comprise buttons, knobs, joysticks, dials, displays, touch screens, etc. Besides manipulating the desired spattering data 6 locally at the device 9, this task can also be done on a remote computer and then transferred to the device by e.g. a memory card or by a wired or wireless data link, whereby the required manipulation at the spattering device's HMI can be reduced. The HMI 26 can also be used as a direction indication 20 for user guidance as discussed.

The spatial referencing unit 7 can be embodied in many different ways as already explained above, dependent on the required range and accuracy, with some exemplary instances thereof being listed in the following.

For example, a GPS-based positioning system which is combined with at least one electronic rangefinder for accurately determining the target distance can be used in outdoor applications.

Another embodiment achieves a referenced target distance by support wheels and only requires a GPS, preferably one with enhanced accuracy such as an RTK-corrected GPS or DGPS.

Yet another embodiment can have a spatial referencing unit which requires the setup of at least one external base station or reference mark which for example can, also be used indoors. Examples of such base stations can be a laser scanner, RIM-camera, Theodolite, Totalstation, Tachymeter, Laser-Leveler, Laser Tracker, etc.

Also, the other embodiments of the spatial referencing units 7 which were mentioned above and also various combinations of those can be used according to the invention. In particular, an IMU can be used to determine the dynamics of movement of the hand held device, which information can be combined with a comparably more statically spatial position and orientation measurement.

The nozzles 1 and nozzle control means 4 are also comprised in the shown, spattering device 9, in particular this embodiment comprises a plurality of nozzles 1 in a row-arrangement.

The illustrated embodiment also comprises one or more spattering material supply(s) 5 and spattering material tank(s) 12. In combination with an energy storage such as a battery and/or a compressed gas tank, this allows the wireless spattering device 9 to be moved freely by hand without any cables and/or supply lines.

Another embodiment can be split into a kind of backpack, comprising the heavier parts like power-supply and spattering material tank which is linked to a lightweight handheld nozzle-device by cables and pipes for lowering the burden on the user's hand. Such an arrangement could also comprise an additional support frame attached to the ground or to the operator's body for distributing the device's load from the users hand to other areas. Embodiments of such supports are known for example in the area of smoothly guiding bulky professional film or video cameras.

The spattering device 9 can comprise an indication means for user guidance, which assists the user in following a desired path and/or to guide his hand to areas which still need to be spattered. Such guidance can be achieved by optical, acoustic or haptic means. For example, a desired direction indication by LEDs or by symbols on a screen which point to the desired direction. It is also possible to display more advanced, e.g. 3D guidance information on an electronic display or to project guiding lines, shapes, symbols or indications directly onto the target surface to be spattered. Also, an acoustic indication by voice commands or beeps can be used. Another option could comprise a vibration of the device's handle e.g. if the distance between the nozzle(s) and the target surface is out of an acceptable or automatically correctable range. Those indication means can be comprised in the HMI 26 mentioned above.

An embodiment of a spattering device 9 according to the invention can also comprise or can be linked to further environmental sensors 6A for determining the local environmental conditions such as temperature, wind speed, humidity, time, and other factors influencing the drying conditions of the spattering material. The environmental information gathered by those sensors 6A can be used by the computation means to command the nozzle control mechanism, e.g. in multiple layer painting. Furthermore, there can be sensors 6A for analyzing the spattering material, like determining its viscosity, flow rate, supply stock, etc. Also, the direction of gravity can be taken into account in the determination of desired expelling characteristics.

An embodiment of the spattering device 9 according to the invention can be pure manually moved by hand or be at least partly supported by means such as guiding rails, trolley stands, wheeled carts, joint-arms for weight reduction or compensation and/or spatial referencing (still hand guided—no full automated motorized robot solution). For example a hand cart for marking sports-fields with chalk-lines comprising a spattering device according to the invention which guides the user to hand-drag it along the desired path of the desired markings by an indication means 26, and automatically corrects minor deviation by the nozzle control means, and in particular can also be used to accurately apply sports club logos onto grounds or walls by the hand held device 9. This can be done in multi-colour, subsequently for each colour, by loading the spattering device 9 according to the invention with the desired colour and applying the parts of the logo which require this colour and then loading the next colour. Another option is the use of a spattering device 9 according to the invention comprising an automatic colour mixing and being capable of applying a multi-colour-spattering onto the target surface 3.

An embodiment of the surface spattering device 9 according to the present invention can comprise a spatial referencing unit 4 built in such a way to reference the surface spattering device 9 in at least five degrees of freedom, in particular by a position, an angle and/or an inertial determination means such as an inertial measurement unit (IMU), Electronic distance meter (EDM), Global positioning system (GPS), Local positioning system (LPS), Geodetic instrument, Passive articulated arm, Stereographic camera, 3D-Scanner and/or RIM-Camera, which can be comprised alone or in combination in the spattering device 9. The spatial referencing unit 4 or parts of it can also be placed externally of the spattering device 9 and corresponding reference marks can be comprised in the spattering device 9.

An embodiment of the surface spattering device 9 according to the present invention can also comprises an additional sensor means 6A for determining target surface 3 properties, in particular spattered and non-spattered areas, present spattering thickness, present surface colour and/or direction of gravity.

An embodiment of the surface spattering device 9 according to the present invention can be built in such a way that the target surface 3 is spattered by one or more colour or material 2, wherein the colour or material 2 can be:
- mixed by dithering or spattering a dot-matrix of spots of spattering material of a basic set of different colours or materials 2 from the spattering material supply 5,
- mixed online, inside or in front of the nozzle means 1 or by overlaying spots of different spattering material 2 on the target surface 3, out of a basic set of different spattering materials 2 or
- mixed offline, with pre-mixed colour or material 2 being supplied from the spattering material supply 5.

The embodiment of the surface spattering device 9 which is shown in FIG. 7 is supplied by desired spattering data 6 in form of three dimensional object information, for example a CAD Model of a solid object 30 to be built up by spattering material 2. The arrows 36 illustrate a coordinate system in which the handheld device is freely movable by the user in 6 degrees of freedom. The arrows 36 can also be seen an illustration of the spatial referencing of the device 9 which is done in 5 or 6 degrees of freedom. The target surface in this illustration is the already spattered part of the object—so to say an intersection of the object to be spattered—, which is progressing during the spattering task. The embodiment of the figure also illustrates the above mentioned spatial referencing by a tracker system 7b, which is determining the position and orientation of the spattering device in at least five degrees of freedom.

In contrast thereto, FIG. 8 shows an example of a prior art 3D-printer which is built by a Cartesian frame structure X,Y,Z. The process of 3D printing is executed by expelling material to build up the object 30 by equidistant layers of material. In some alternative embodiments, already present material is cured in equidistant layers stacked upon each other for a layered build-up of the object 30. In some cases, e.g. to build cantilevers, additional support structures have to be built and removed later on to be able to print the object. Also, the object size is limited by the machines frame structure.

Figure 9:
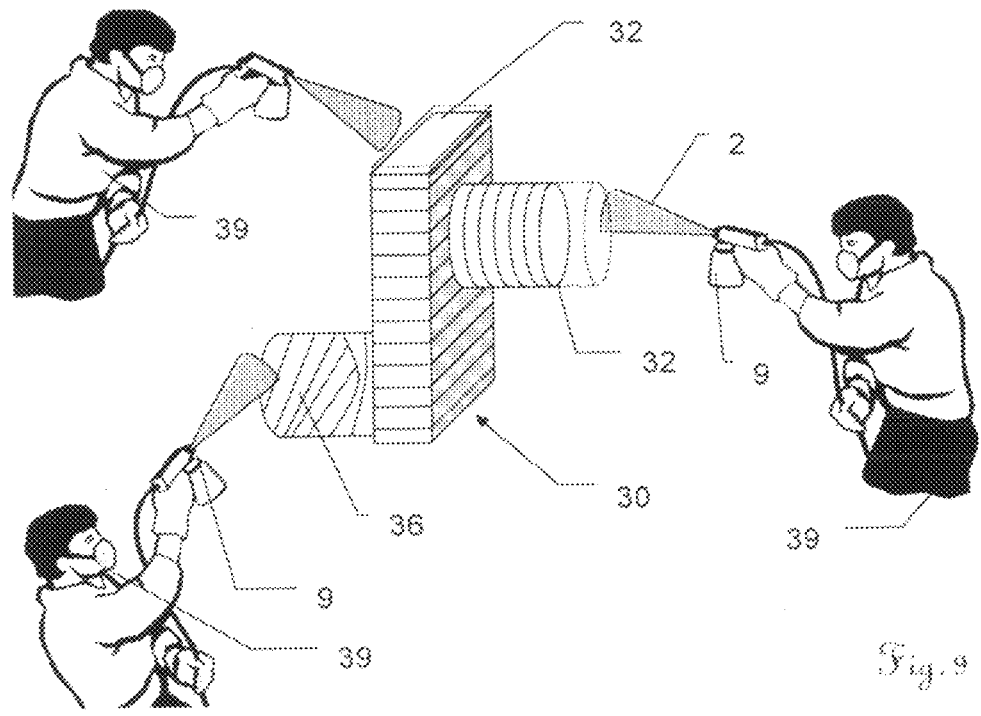
FIG. 9 shows an exemplary embodiment of a surface spattering device according to the present invention which is spattering a three dimensional object.

As shown in FIG. 9, the above mentioned drawbacks can be overcome according to the present invention with the presented handheld surface spattering device 9. Objects can be spattered by the human operator 39 from any spatial position and direction, as illustrated by the positions in the figure. Apparently, also multiple users 39 and spattering devices 9 can work on the same object 30 at the same time to increase productivity. The object 30 can be built up by layers 32 of spattering material applied from any direction; so temporary supporting structures are in general not needed. Also the layers do not have to be plain and equidistant as in prior art, but can be freely shaped.

The shapes of the layers can be predetermined in the desired spattering data or the spattering can done freely, dependent on the users 39 movements and aiming of the of the device 9. In contrast to FIG. 8, this also allows an unlimited object size, since the printing area is not limited. The above described user guidance will be executed accordingly. The details of the spattering process and were already discussed above.

What is claimed is:

1. A handheld, dynamically movable surface spattering device, comprising
    a plurality of nozzles, each nozzle of the plurality of nozzles configured to expel spattering material onto a target surface;
    a nozzle control mechanism configured to control characteristics of expelling the spattering material from the plurality of nozzles;
    a plurality of spattering material supplies, each spattering material supply of the plurality of spattering material supplies corresponding with a respective nozzle of the plurality of nozzles and associated with a different color of spattering material;
    a storage with a digital representation of a predefined artwork or image to be applied to the target surface, wherein the predefined artwork or image comprises a multicolor pattern;
    a spatial referencing unit to spatially reference the spattering device in space; and
    a computational unit to control the expelling by the nozzle control mechanism according to information gained by the spatial referencing unit and according to the digital representation of the predefined artwork or image spattering data, wherein:
        wherein the computational unit is configured to cause the nozzle and/or the nozzle control mechanism to apply the predefined artwork or predefined image onto the target surface with the sputtering material;
        the computational unit is configured to cause each of the plurality of nozzles to expel spattering material as a spattering spot to the target surface, wherein the spattering spot is dependent on
            a spatial reference of the spattering device;
            a set of characteristics of the expelling of the nozzle; and
            a measured or calculated distance and inclination of the nozzle relative to the target surface;
    wherein the computational unit is further configured to adjust the spattering spot by changing the characteristics of expelling of each of the plurality of nozzles in such a way that the target surface is spattered according to the predefined artwork or image in a multicolor pattern by a plurality of colors or materials, wherein the colors or materials are mixed by dithering a dot-matrix of spots of spattering material of a basic set of different colors or materials from the spattering material supply.

2. A handheld, dynamically movable surface spattering device according to claim 1, wherein
    the characteristics of the expelling of the nozzle comprises expelling direction, expelling speed, expelling divergence, expelling spreading, expelling shape and/or expelling material rate.

3. A handheld, dynamically movable surface spattering device according to claim 1, wherein
    the spatial referencing unit is to reference the spattering device relative to the target surface in at least five degrees of freedom by position and angle determination means.

4. A handheld, dynamically movable surface spattering device according to claim 1, wherein the spatial referencing unit is to reference the surface spattering device in at least five degrees of freedom by position, angle and/or inertial determination including at least one of:
    Inertial measurement unit (IMU);
    Electronic distance meter (EDM);
    Global positioning system (GPS);
    Local positioning system (LPS);
    Geodetic instrument;
    Passive articulated arm;
    Stereographic camera;
    3D-Scanner; and
    REM-camera comprised in the spattering device and/or reference marks comprised in the spattering device and the spatial referencing unit placed externally of the spattering device.

5. A handheld, dynamically movable surface spattering device according to claim 1, wherein
the surface spattering device comprises a second sensor configured to determine target surface properties.

6. A handheld, dynamically movable surface spattering device according to claim 5, wherein
the surface spattering device comprises a third sensor configured to:
determine at least one of spattered and non-spattered areas, present spattering thickness, or
present surface colour and/or direction of gravity as target surface properties.

7. A handheld, dynamically movable surface spattering device according to claim 1, wherein
a direction of expelling of the nozzle is displaceable for fine adjusting targeting direction as an expelling characteristics, dependent on dynamic movement and the spatial reference of the handheld surface spattering device to compensate a tremor or an uncertainty of guidance of a hand holding the surface spattering device.

8. A handheld, dynamically movable surface spattering device according to claim 1, wherein
the surface spattering device is to indicate a desired movement by one or more of:
an indication light;
a graphical display;
a projection of a direction of movement onto the target surface;
an augmented reality display or projection;
an acoustic guidance signal; or
haptic guidance signals;
to support a user to follow an optimized path to apply the spattering onto the target surface.

9. A handheld, dynamically movable surface spattering device according to claim 1, comprising
a sensor to sense at least one environmental condition where a drying condition of the spattering material is determined and incorporated in the control of the expelling characteristics.

10. A handheld, dynamically movable surface spattering device according to claim 1, wherein
the handheld surface spattering device is attached to a support unit, which is configured to
guide and smooth movements, and/or
compensate device-weight.

11. A handheld, dynamically movable surface spattering device according to claim 1, wherein
the computational unit is configured to use an information history of previously spattered areas on the target surface to spatter the target surface according to the predefined artwork or image.

12. A handheld, dynamically movable surface spattering device according to claim 11, wherein
the computational unit is configured to use an information history of previously spattered areas on the target surface to spatter the target surface according to the predefined artwork or image in multiple spattering sessions.

13. A handheld, dynamically movable surface spattering device according to claim 1 further comprising a plurality of nozzles arranged in one or more row or line arrangements.

14. A handheld, dynamically movable surface spattering device according to claim 1, wherein
the predefined artwork or image comprises three dimensional structures to be built up out of spattering material by a subsequent expelling of multiple layers of spattering material using previously applied spattering material as a target surface.

15. A handheld, dynamically movable surface spattering device according to claim 14, wherein three dimensional structures of spattering material are built by layers of spattering material orientated in different directions and applied from different spatial directions.

16. A handheld, dynamically movable surface spattering device according to claim 15, wherein
the spattering device is built and controlled in such a way to achieve a hand held 3D printing of a three dimensional structure.

17. A handheld, dynamically movable surface spattering device according to claim 1 further comprising a cure unit to cure the expelled spattering material.

18. A handheld, dynamically movable surface spattering device according to claim 1, further comprising
a three dimensional scanner to track the target surface and an already built portion three dimensional structure to spatially reference the spattering device relative to a three dimensional structure.

19. A handheld, dynamically movable surface spattering device according to claim 1, wherein
the spattering device is built and controlled in such a way to achieve a hand held 3D printing of a three dimensional structure.

20. A handheld, dynamically movable surface spattering device according to claim 1, wherein the predefined artwork or image comprises two-dimensional artwork or two-dimensional image, and wherein a 3D printing of a three dimensional structure is created by building up multiple layers of spattering material using the two-dimensional artwork or two-dimensional image.

21. A handheld, dynamically movable surface spattering device according to claim 1, wherein the predefined artwork or image comprise a matrix of predefined pixels which are defining spots of spattering material to be applied.

22. A handheld, dynamically movable surface spattering device according to claim 1, wherein the computational unit is configured to cause the nozzle and/or the nozzle control mechanism to paint the predefined two-dimensional artwork or predefined two-dimensional image onto the target surface.

23. A handheld, dynamically movable surface spattering device according to claim 1, wherein
the spatial referencing unit is configured to reference the surface spattering device in at least five degrees of freedom by position, angle and/or inertial determination including a passive articulated arm.

24. A handheld, dynamically movable surface spattering device, comprising:
a plurality of nozzles, each nozzle of the plurality of nozzles configured to expel spattering material onto a target surface;
a nozzle control mechanism configured to control characteristics of expelling the spattering material from the plurality of nozzles;
a plurality of spattering material supplies, each spattering material supply of the plurality of spattering material supplies corresponding with a respective nozzle of the plurality of nozzles and associated with a different color of spattering material;

a data storage with a digital representation of a predefined two-dimensional artwork or predefined two-dimensional image to be applied to the target surface, wherein the predefined two-dimensional artwork or the predefined two-dimensional image comprises a multicolor pattern;

a spatial referencing unit to spatially reference the spattering device in space based on the digital representation of a predefined two-dimensional artwork or predefined two-dimensional image; and a computational unit to control the expelling by the plurality of nozzles control mechanism according to information gained by the spatial referencing unit and according to the digital representation of the predefined two-dimensional artwork or predefined two-dimensional image in the data storage, wherein the computational unit is configured to cause the nozzle and/or the nozzle control mechanism to paint the predefined two-dimensional artwork or predefined two-dimensional image onto the target surface;

wherein the computational unit is configured to cause each of the plurality of nozzles to expel spattering material as a spattering spot to the target surface, wherein the spattering spot is dependent on a spatial reference of the spattering device;

a set of characteristics of the expelling of the nozzle; and a measured or calculated distance and inclination of the nozzle relative to the target surface;

wherein the computational unit is further configured to adjust the spattering spot by changing the characteristics of expelling of each of the plurality of nozzles in such a way that the target surface is spattered according to the predefined two-dimensional artwork or predefined two-dimensional image in a multicolor pattern by a plurality of colors or materials, wherein the colors or materials are mixed by dithering a dot-matrix of spots of spattering material of a basic set of different colors or materials from the spattering material supply.

25. A handheld, dynamically movable surface spattering device, comprising a plurality of nozzles, each nozzle of the plurality of nozzles configured to expel spattering material onto a target surface;

a nozzle control mechanism configured to control characteristics of expelling the spattering material from the plurality of nozzles;

a plurality of spattering material supplies, each spattering material supply of the plurality of spattering material supplies corresponding with a respective nozzle of the plurality of nozzles and associated with a different color of spattering material;

a storage with a digital representation of a predefined artwork or image to be applied to the target surface;

a spatial referencing unit to spatially reference the spattering device in space; and a computational unit to control the expelling by the nozzle control mechanism according to information gained by the spatial referencing unit and according to the digital representation of the predefined artwork or image spattering data, wherein:

wherein the computational unit is configured to cause the nozzle and/or the nozzle control mechanism to apply the predefined artwork or predefined image onto the target surface with the sputtering material;

the computational unit is configured to cause each of the plurality of nozzles to expel spattering material as a spattering spot to the target surface, wherein the spattering spot is dependent on a spatial reference of the spattering device;

a set of characteristics of the expelling of the nozzle; and a measured or calculated distance and inclination of the nozzle relative to the target surface;

wherein the computational unit is further configured to adjust the spattering spot by changing the characteristics of expelling of each of the plurality of nozzles in such a way that the target surface is spattered according to the predefined artwork or image;

wherein the target surface is spattered by a plurality of colors from the plurality of nozzles with a dithering a dot-matrix of spots of spattering material of a basic set of different colors or materials from the plurality of spattering material supplies.

26. A handheld, dynamically movable surface spattering device, comprising a plurality of nozzles, each nozzle of the plurality of nozzles configured to expel spattering material onto a target surface;

a nozzle control mechanism configured to control characteristics of expelling the spattering material from the plurality of nozzles;

a plurality of spattering material supplies, each spattering material supply of the plurality of spattering material supplies corresponding with a respective nozzle of the plurality of nozzles and associated with a different color of spattering material;

a storage with a digital representation of a predefined artwork or image to be applied to the target surface, wherein the predefined artwork or image comprises a multicolor pattern;

a spatial referencing unit configured to spatially reference the spattering device in space and to reference the surface spattering device in at least five degrees of freedom by position, angle and/or inertial determination including a passive articulated arm; and a computational unit to control the expelling by the nozzle control mechanism according to information gained by the spatial referencing unit and according to the digital representation of the predefined artwork or image spattering data, wherein:

wherein the computational unit is configured to cause the nozzle and/or the nozzle control mechanism to apply the predefined artwork or predefined image onto the target surface with the sputtering material;

the computational unit is configured to cause each of the plurality of nozzles to expel spattering material as a spattering spot to the target surface, wherein the spattering spot is dependent on a spatial reference of the spattering device;

a set of characteristics of the expelling of the nozzle; and a measured or calculated distance and inclination of the nozzle relative to the target surface;

wherein the computational unit is further configured to adjust the spattering spot by changing the characteristics of expelling of each of the plurality of nozzles in such a way that the target surface is spattered according to the predefined artwork or image in a multicolor pattern by a plurality of colors or materials, wherein the colors or materials are mixed by dithering a dot-matrix of spots of spattering material of a basic set of different colors or materials from the spattering material supply.

27. A method for spattering a surface by a handheld surface spattering device, the method comprising:

spatially referencing the surface spattering device, in at least five degrees of freedom by determining position and angle of a spattering device;

acquiring a set of spattering data by reading a storage comprising a digital image or model as multicolor pattern to be applied to a target surface, wherein the set of spattering data is a digital representation of a multicolor pattern to be spattered onto the target surface comprising information on multiple sections of the target surface to be spattered with different multicolor spatial attributes;

expelling a spattering material by a plurality of nozzles onto the target surface to apply the predefined artwork or predefined image onto the target surface;

controlling expelling characteristics of the plurality of nozzles by a nozzle control mechanism;

computing of expelling characteristics for the nozzle control mechanism according to information gained by the spatially referencing and the acquiring of spattering data;

wherein computing of expelling characteristics is based on a spattering area on the target surface, wherein the spattering area is dependent on a spatial reference of the spattering device, a characteristic of the expelling of the plurality of nozzles and an actual or forecasted distance and inclination of each of the plurality of nozzles relative to the target surface determined by the spatial referencing, and spattering the target surface according to the spattering data to produce the multicolor pattern with a plurality of colors or materials, wherein the colors or materials are mixed by dithering a dot-matrix of spots of spattering material of a basic set of different colors or materials from the spattering material supply.

28. A method according to claim 27, wherein
spatially referencing the surface spattering device, in at least five degrees of freedom by determining position and angle of the spattering device, is relative to the target surface.

29. A method according to claim 27, wherein
computing of expelling characteristics for the nozzle control mechanism according to the information gained by the spatially referencing and the acquiring of spattering data includes a drying condition depending on environmental parameters.

30. A method according to claim 27, wherein
controlling of the expelling characteristics comprises an adapting of colour and/or consistence of the applied spattering by a mixing or subsequent alignment of multiple spattering materials before, while or after expelling of the spattering material.

\* \* \* \* \*